United States Patent [19]
Imura

[11] 4,176,930
[45] Dec. 4, 1979

[54] CAMERA WITH SELF-CONTAINED FLASH DEVICE
[75] Inventor: Toshinori Imura, Sakai, Japan
[73] Assignee: Minolta Camera Kabushiki Kaisha, Sakai, Japan
[21] Appl. No.: 883,556
[22] Filed: Mar. 6, 1978
[30] Foreign Application Priority Data
  Mar. 7, 1977 [JP] Japan ................... 52-23924
[51] Int. Cl.² .......................... G03B 7/00; G03B 9/02; G03B 15/03
[52] U.S. Cl. ..................................... 354/59; 354/149; 354/274
[58] Field of Search .................. 354/32, 42, 59, 126, 354/145, 148, 149, 167, 222, 274, 196, 46, 139, 197; 362/3, 16, 18

[56] References Cited
U.S. PATENT DOCUMENTS

| 3,167,256 | 1/1965 | Elliott | 362/18 X |
| 3,878,385 | 4/1975 | Kingston | 354/126 X |
| 3,906,529 | 9/1975 | Filipovich | 354/196 |
| 3,961,344 | 6/1976 | Baisch et al. | 354/222 |
| 4,122,463 | 10/1978 | Tanaka | 354/149 X |
| 4,122,466 | 10/1978 | Iwata | 354/32 |

Primary Examiner—John Gonzales
Assistant Examiner—Thomas H. Tarcza
Attorney, Agent, or Firm—Wolder, Gross & Yavner

[57] ABSTRACT

A camera includes alternatively operable first and second objective lenses and a self-contained flash device having an irradiating angle substantially coincident with the angle of view of the second objective lens, the second objective lens having a focal length and F-number greater than those of the first objective lens. The camera is equipped with a light diffusing plate adapted to move into and out of the optical light path of the flash device in association with the operable transfer operation between the first and second objective lenses, and the light diffusing plate is so arranged as to be positioned in the irradiating optical path of the flash device when the first objective lens registers with the picture-taking optical path, so that the irradiating angle of the flash device substantially coincides with the angle of view of the first objective lens.

9 Claims, 2 Drawing Figures

CAMERA WITH SELF-CONTAINED FLASH DEVICE

BACKGROUND OF THE INVENTION

The present invention relates generally to improvements in cameras with flash devices in which there are provided two or more interchangeable objective lenses of different focal lengths which are selectively alternatively transferrable to an operable position registering with the camera picture taking axis.

In a camera having two or more objective lenses of different focal lengths, the picture-taking range, namely, the angle of view of the picture-taking optical system, is dependent on the lens selected. For example, in a camera in which a standard lens and a telephoto lens of longer focal length than that of the standard lens are incorporated as objective lenses, if the telephoto lens is selected, a narrow angle of view is effected, as compared with the case where the standard lens is selected. Where it is desired to take a picture of an object by using a flash device, for example, by illuminating an object by means of an electronic flash device, it is customary to incorporate in the camera a flash device which has an illuminating or irradiating angle coincident with the angle of view of the lens having the shortest focal length (the standard lens in the above-described camera). With such a camera, if a lens having a longer focal length (the telephoto lens in the abovedescribed camera) is selected, only part of an irradiating angle of the flash device is consequently utilized, because of the telephoto lens having a narrow angle of view, as compared with that of the standard lens. In other words, with telephotography, an area beyond the angle of view of the telephoto lens is irradiated by the flash device, and a loss of the energy of the irradiated light results with the resulting inefficiency, restriction and other drawbacks.

In a camera equipped with two or more selectively operable lenses having different focal lengths, it is customery that, the lens with the longest focal length has an F-number greater than those of the other lenses. For among other reasons, there is the requirement to reduce the size of the lenses in order to house these lenses in the confined space within a camera body. However, if the lens of longer focal length is given the same F-number as that of the lens of a shorter focal length, the overall size of the long focal length lens must be larger than that of a lens having the shorter focal length. As a result, such lens cannot be housed in the camera without increasing the overall size of the camera body. In terms of the constant luminosity per unit quantity of light from the flash device, a difference in possible flash-photographic camera to object distance arises between these two lenses, and due to the fact that the F-number increases, with an increase in focal length, short distance photography alone is possible. From the viewpoint of proper functioning of the camera, it is necessary in the camera that, for an object standing at a normal distance from the camera (for example, an object at a distance of 3.5 m from the camera), the flash-photography be achieved at a proper exposure level, even if any lens is selected. To meet the above requirements, the luminosity per unit quantity of light from the flash device must be set to a value at which the object at the aforesaid distance from the camera be flash photographed at a proper exposure level, when the lens having the greatest focal length, (the telephoto lens in the aforesaid example) is used. Thus, a flash device to be incorporated in a camera is bound to increase its guide number as well as its size to a greater extent, resulting in an increase in the overall size of the camera body.

SUMMARY OF THE INVENTION

It is a principal object of the present invention to provide an improved camera housing a flash device, wherein two or more selectively operable objective lenses having different focal lengths are provided in the camera, and independently of the selected lens, the light projected by the flash device is almost completely utilized for picture-taking, with the obviation of any loss of energy or unnecessary light.

It is another object of the present invention to provide an improved camera, having selectively operable lenses having different F-numbers so that an object located at a normal distance from the camera may be flash photographed at a proper exposure level, without a need to increase the size of a flash device or the overall size of the camera body.

DESCRIPTION OF THE PREFERRED EMBODIMENTS

The present invention will now be described in more detail with reference to the accompanying drawings which indicate embodiments of the invention.

Figure 1:
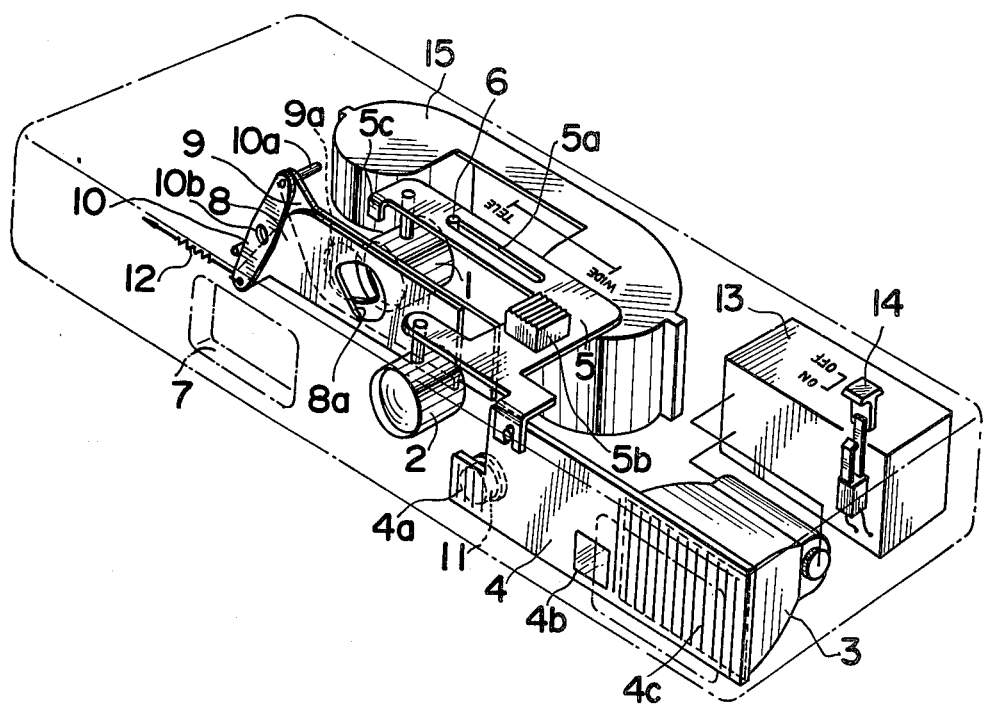
FIG. 1 is a perspective view of a mechanism according to a first embodiment of the present invention.

Referring now to FIG. 1 of the drawing which illustrates a preferred embodiment of the present invention, the improved camera is provided with two objective lenses, a wide-angle lens 1 and a telephoto lens 2. In cooperation with the movement of either one of the objective lenses into registry with the picture-taking optical path of the camera, a diffusion plate or section 4c of a wide panel 4 is shifted or transferred to or away from the front of the light emitting portion 3 of a flash device, in order to match the illuminating or irradiating angle of the flash device with the angle of view of the objective lens which has been selectively positioned in the picture-taking optical path and to compensate for the variation in the guide number of the flash device due to the change in the aforesaid illuminating or irradiating angle so as to achieve an optimum exposure level, an associated diaphragm aperture is automatically adjusted.

Wide-angle lens 1 and telephoto lens 2 are laterally spaced and supported on a lens-supporting frame 5. The lens-supporting frame 5 is slidably movable along the longitudinal direction of the camera, being provided with a longitudinally elongated slot 5a slideably engaged by a pin 6 anchored to the body proper of a camera.

Lens-supporting frame 5 is formed with a manually operable knob or finger piece 5b which serves as an operating knob and an index as well, and is movable so as to register with spaced indicia, "WIDE", and "TELE", which are marked on the top surface of the camera body. Wide panel 4 is moved in the front surface of the camera so as to slidingly move in the longitudinal direction of the camera. Wide panel 4 is coupled to lens-supporting frame 5 by the engagement of a panel mounted pin with a transverse slot in frame 5 and hence, is slidingly moved together with lens-supporting frame. Wide panel 4 integrally includes a laterally spaced small diffusion section or plate 4a adapted to change the light receiving angle of a light receiving element 11 provided on the front surface of the camera body, in response to the angle of view of the selected objective lens; a small transparent section or plate 4b; and another relatively large diffusion plate 4c to cover the light emitting portion 3 of the flash device. Provided inside the camera body in the rear of a front exposure window 7 are a pair of diaphragm or stop-down plates 8 and 9 which may be slidingly moved along the rear surface of objective lens 2 and the front surface objective lens 1 when a respective lens is in registry with the picture-taking axis. Openings 8a and 9a of tear-drop shapes, as shown, are provided in the respective stop-down plates. One end of each of both stop-down plates 8 and 9 is engaged by a corresponding end of a diaphragm operating lever 10 pivoted to a camera body in a manner to rotate about a central shaft aperture 10b therein. A pin 10a is provided on one end of diaphragm operating lever 10 and is positioned in the path of and adapted to engage a bent piece 5c formed on lens-supporting frame 5. Diaphragm operating lever 10 is resiliently urged to rotate or swing in a clockwise direction by a spring 12 and is restricted by abutting a stop member. Shown at 13 is a flash circuit for energizing and triggering the flash device, at 14 an electric power switch therefor, and at 15 a film cartridge loaded in the camera body.

In operation, when knob 5b is manually set to the "WIDE" indicia, the wide-angle objective lens 1 is moved into axial alignment with window 7 and into registry with the camera picture taking axis, whereupon diffusion plate 4a of wide panel 4 is positioned at the front of light receiving element 11 and the diffusion plate 4c is moved to the front of light emitting portion 3 of the flash device. Simultaneously therewith, pin 10a is disengaged from bent piece 5c, with the result that diaphragm operating lever 10 is rotated clockwise under the influence of spring 12 to abut the stop member so that the stop-down plates 8 and 9 effect a fully open aperture defined by the respective openings 8a and 9a thereof (See FIG. 1). Diffusion plate 4c diffuses or increases the projection angle of the light from light emitting portion 3 in a manner commensurate with the angle of view of wide angle objective lens 1, thereby completely illuminating or irradiating the object within such angle of view. The object reflected light incident on the camera is focused on the film in the film cartridge 15 by wide angle lens 1, traversing exposure window 7 and then the aperture defined by openings 8a and 9a formed in stop-down plates 8 and 9, which are maintained in the aperture fully open position.

When taking a picture by means of the telephoto lens 2, lens supporting frame 5 is slidingly moved or transferred to the left by setting knob 5b to the indicia "TELE". With this operation, telephoto objective lens 2 is moved to the front of the aperture defined by openings 8a and 9a positioned in the photographic optical path, whereupon diffusion plate 4a is moved away from the front of light receiving element 11, while transparent plate 4b is brought into registry with the front of light receiving element 11. Simultaneously therewith, diffusion plate 4c is transferred or moved away from the front of light emitting portion 3 in the flash device. As a result, the light projected or radiated from light emitting portion 3 irradiates or illuminates an object at an irradiating angle commensurate with the angle of view of telephoto lens 2 (smaller than that of wide-angle lens 1) without being diffused. In this manner, with the illuminating or irradiating angle of light emitting portion 3 being varied, there results a variation in the guide number of the flash device, so that the exposure must be adjusted to compensate for the change in the guide number.

With the aforesaid embodiment, when lens-supporting frame 5 is shifted to the left, bent piece 5c engages pin 10a on the diaphram operating lever 10, thereby rotating lever 10 counterclockwise against the influence of spring 12. As a result, stop-down plates 8 and 9 pivoted to the opposite ends of lever 10 are slidingly moved to the right and left, respectively, so that the aperture defined by openings 8a and 9a is stopped down. In other words, the aperture in its fully open position at wide angle photography is stopped down at telephotography, commensurate with the actual variation in the guide number of the flash device.

Considering a specific example of the above-described embodiment assume that the wide-angle objective lens 1 has a focal length f=25 mm and an aperture of $F_4$, while telephoto lens 2 is a reference lens having an aperture of $F_4$ and a focal length of f=50 mm, and the guide number GN of the flash device is 8 (m), then the camera-to-object distance for taking a picture with the predetermined guide number and the F number will be 8/4=2 (m) in the case of the use of wide-angle lens 1. When the wide-angle lens is interchanged with the telephoto lens 2, and an irradiating angle of the flash device is changed so as to match the angle of view of the telephoto lens 2, the guide number GN 432 16 (m) so that upon taking a picture of an object located 2 m from the camera, overexposure occurs. Thus, for compensating for the exposure in the case of telephoto lens 2, the aperture should be stopped down from $F_4$ so that 16/x=2, at which x=8. Now, it is understood that the aperture should be stopped down to $F_8$ so as to take a photograph of an object at a camera-to-object distance of 2 m with a proper exposure.

Light-receiving element 11 may be used for an exposure control circuit of the camera. In addition, an automatic electronic flash device may be used in which light-receiving element 11 may be used for controlling the quantity of flash-emitted light. Upon exchange of the lenses, either panel 4a or glass 4b is selectively moved to the front of the light-receiving element 11 so as to change the angle of view of the light incident on receiving element 11 and contribute to the compensation for the error in light measurement in daylight photography in the former case, as well as to the accurate control of the quantity of light emitted from the flash device in the latter case.

Figure 2:
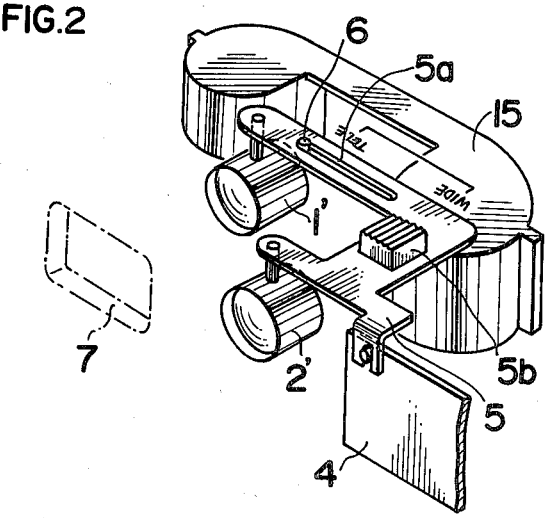
FIG. 2 is a fragmentary perspective view of a mechanism according to another embodiment of the present invention.

The embodient shown in FIG. 2 obviates the need for the stop-down members 8,9,10, 12 by providing the both lenses with fully open apertures having such values as to accommodate themselves to the variation in guide number due to the variation in the irradiating angle of the flash device. In the above case, the wide-angle lens 1' has a fully open aperture of $F_4$ and a focal length f=25 mm, and the telephoto lens 2' has a fully open aperture of $F_8$, and a focal length f=50 mm. In this embodiment, like parts are designated by like reference numerals.

While there have been described and illustrated preferred embodiments of the present invention, it is apparent that numerous alterations, omissions and additions may be made without departing from the spirit thereof.

I claim:

1. A camera comprising;
    a camera body having a picture-taking optical path;
    a first objective lens having a predetermined focal length and a predetermined F-number;
    a second objective lens having a focal length and an F-number greater than those of said first objective lens;
    externally operable change-over means for selectively setting said first or second lens into registry with said picture-taking optical path;
    a flash device having an irradiating angle substantially coincident with the angle of view of said second objective lens; and
    an irradiating angle changing means movable between an inoperative position and an operative position, at which said changing means enlarges the irradiating angle of said flash device to substantially correspond with the angle of view of said first objective lens, said irradiating angle changing-means being responsive to said change-over means and being normally maintaintained in an inoperative position and transferred to its operative position only when said first objective lens is in registry with said picture-taking optical path.

2. A camera as defined in claim 1, wherein said irradiating angle changing means includes a light diffusing plate shiftable between an inoperative position in which said plate is offset from the irradiating optical path of said flash device and an operative position, in which said plate registers with the irradiating optical path.

3. A camera as defined in claim 2, wherein;
    said camera body is of flat rectangular parallelopiped configuration;
    said flash device is disposed proximate an end of said camera body in the longitudinal direction thereof and has an irradiating optical axis in a plane common with said picture-taking optical axis;
    the light diffusing plate is slidable along the front surface of the camera along the longitudinal direction thereof and is positioned between the flash device and the picture-taking optical path, when said light diffusing plate is moved to a retracted position away from the irradiating optical path of said flash device; and
    said change-over means includes a transfer member carrying said first objective lens and said second objective lens and slidable in the longitudinal direction of the camera, a manually operable portion movable integrally with said transfer member and an operating arm for shifting said light-diffusing plate with the movement of said transfer member, said operating arm being integrally formed with said transfer member.

4. A camera defined in claim 3, further comprising;
    a light receiving element for measuring the brightness of an object under ambient light conditions in which the flash device remains inoperative, said light-receiving element having a light receiving angle substantially coincident with the angle of view of said second objective lens; and,
    a second light-diffusing plate movable to a position in front of said light-receiving element and retractable therefrom and being responsive to said change-over means so as to be positioned in front of said light receiving element, only when said first objective lens registers with said picture-taking optical path, said second light-diffusing plate, when positioned in front of said light-receiving element, enlarging the light receiving angle of said light receiving element to substantially correspond with the angle of view of said first objective lens.

5. A camera as defined in claim 4, wherein said light-diffusing plate and said second light diffusing plate are integrally formed.

6. A combination photographic camera and photoflash device comprising:
    a camera body having a photographing axis;
    a photographing objective lens system including means for manually adjusting the focal length of the lens system operatively registering with said photographing axis by a fixed predetermined increment to alternative fixed predetermined values;
    a photoflash device including a light projection member; and
    means movable in response to said focal length adjusting means between an inoperative position offset from the irradiating optical axis of the photoflash device and an operative position in registry with the irradiating optical axis of the photoflash device to adjust the angle of the light projected by said light projection member by a fixed predetermined increment so as to correspond to the angle of view of said lens system in operative registry with the photographing axis.

7. The device of claim 6 wherein said objective lens system includes a relatively short focal length objective lens and a relatively long focal length second objective lens and said focal length adjusting means includes means for selectively alternatively positioning said objective lenses in registry with said photographing axis.

8. The device of claim 7 wherein said light projection member normally has a light projection angle corresponding to that of second objective lens and said projected light angle varying means includes a light diffusion member movable between a position laterally offset from said light projection member and a position registering with the front of said light projection member in response to said second and first objective lenses respectively registering with said photographing axis, said light diffusion member, when registering with said light projecting member, increasing the angle of the projected light to correspond to the angle of view of said first objective lens.

9. The device of claim 6 including a variable aperture diaphragm intercepting said photographing axis and means for reducing and increasing the size of said diaphragm aperture in response to the increase and decrease respectively of the focal length of the lens system in operative registry with said photographic axis.

* * * * *